(12) United States Patent
Shirozono et al.

(10) Patent No.: US 11,505,179 B2
(45) Date of Patent: Nov. 22, 2022

(54) PARKING ASSISTANCE DEVICE AND PARKING ASSISTANCE METHOD

(71) Applicant: Mitsubishi Electric Corporation, Tokyo (JP)

(72) Inventors: Masataka Shirozono, Tokyo (JP); Takahisa Aoyagi, Tokyo (JP); Kenta Katsu, Tokyo (JP); Hiroshi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/257,707

(22) PCT Filed: Oct. 3, 2018

(86) PCT No.: PCT/JP2018/037013
§ 371 (c)(1),
(2) Date: Jan. 4, 2021

(87) PCT Pub. No.: WO2020/070822
PCT Pub. Date: Apr. 9, 2020

(65) Prior Publication Data
US 2021/0291814 A1    Sep. 23, 2021

(51) Int. Cl.
*H04N 5/44*    (2011.01)
*B60W 30/06*    (2006.01)
(Continued)

(52) U.S. Cl.
CPC ............ *B60W 30/06* (2013.01); *B60W 30/09* (2013.01); *B60W 30/0956* (2013.01);
(Continued)

(58) Field of Classification Search
CPC .. B60W 30/06; B60W 30/09; B60W 30/0956; B60W 50/14; B60W 60/0011;
(Continued)

(56) References Cited

U.S. PATENT DOCUMENTS

2017/0028914 A1    2/2017  Kiyokawa et al.
2018/0037262 A1    2/2018  Imai
(Continued)

FOREIGN PATENT DOCUMENTS

JP    2007-161119 A    6/2007
JP    2009-202610 A    9/2009
(Continued)

OTHER PUBLICATIONS

International Search Report for PCT/JP2018/037013 dated Dec. 11, 2018.
(Continued)

*Primary Examiner* — Munear T Akki
(74) *Attorney, Agent, or Firm* — Sughrue Mion, PLLC; Richard C. Turner

(57) ABSTRACT

The present invention relates to a parking assistance device, and includes: a surrounding detection part detecting surrounding information of a vehicle which is to be parked to detect a parking space where the vehicle can be parked; a parking route generation part generating a traveling route from a current position of the vehicle to the parking space; a travel controller making the vehicle travel to the parking space along the traveling route; an obstacle detection part detecting an obstacle around the vehicle; and a parking route regeneration part generating a new traveling route to avoid a collision between the vehicle and the obstacle and park the vehicle in the parking space in a case where the travel controller makes the vehicle travel to the parking space along the traveling route, wherein the travel controller makes the vehicle travel along the new traveling route when the new traveling route is generated.

15 Claims, 24 Drawing Sheets

(51) Int. Cl.
  *B60W 60/00* (2020.01)
  *B60W 30/09* (2012.01)
  *B60W 30/095* (2012.01)
  *B60W 50/14* (2020.01)
  *G06V 20/58* (2022.01)

(52) U.S. Cl.
  CPC ........ *B60W 50/14* (2013.01); *B60W 60/0011* (2020.02); *G06V 20/58* (2022.01); *G06V 20/586* (2022.01); *B60W 2050/146* (2013.01); *B60W 2540/18* (2013.01); *B60W 2554/802* (2020.02)

(58) Field of Classification Search
  CPC ....... B60W 2050/146; B60W 2540/18; B60W 2554/802; G06V 20/58; G06V 20/586; B62D 15/0285
  See application file for complete search history.

(56) References Cited

U.S. PATENT DOCUMENTS

| | | | |
|---|---|---|---|
| 2018/0215413 A1* | 8/2018 | Inagaki | B62D 15/0285 |
| 2018/0273028 A1 | 9/2018 | Kato et al. | |
| 2018/0281680 A1* | 10/2018 | Gerardo Castro | G06N 7/005 |
| 2018/0286240 A1 | 10/2018 | Harai | |
| 2018/0354556 A1* | 12/2018 | Hirata | G06V 20/588 |
| 2020/0055522 A1* | 2/2020 | Kasai | B60W 50/0225 |

FOREIGN PATENT DOCUMENTS

| | | |
|---|---|---|
| JP | 2011-16401 A | 1/2011 |
| JP | 2015-74321 A | 4/2015 |
| JP | 2016-185745 A | 10/2016 |
| JP | 2017-30568 A | 2/2017 |
| JP | 2017-65455 A | 4/2017 |
| JP | 2018-158674 A | 10/2018 |
| WO | 2006/064544 A1 | 6/2006 |

OTHER PUBLICATIONS

Communication dated Jul. 27, 2021, issued by the Japanese Patent Office in application No. 2020-551002.
Office Action dated Oct. 12, 2021 in Japanese Application No. 2020-551002.

* cited by examiner

F I G. 1
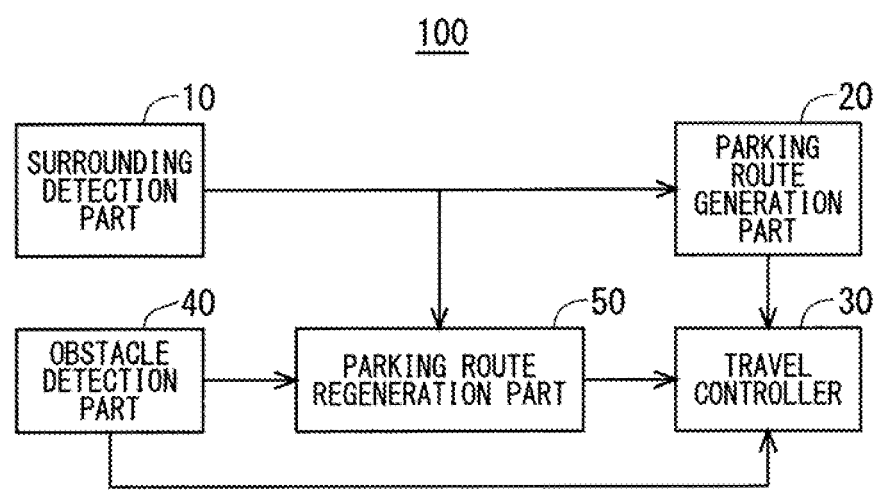

OV

F I G. 10
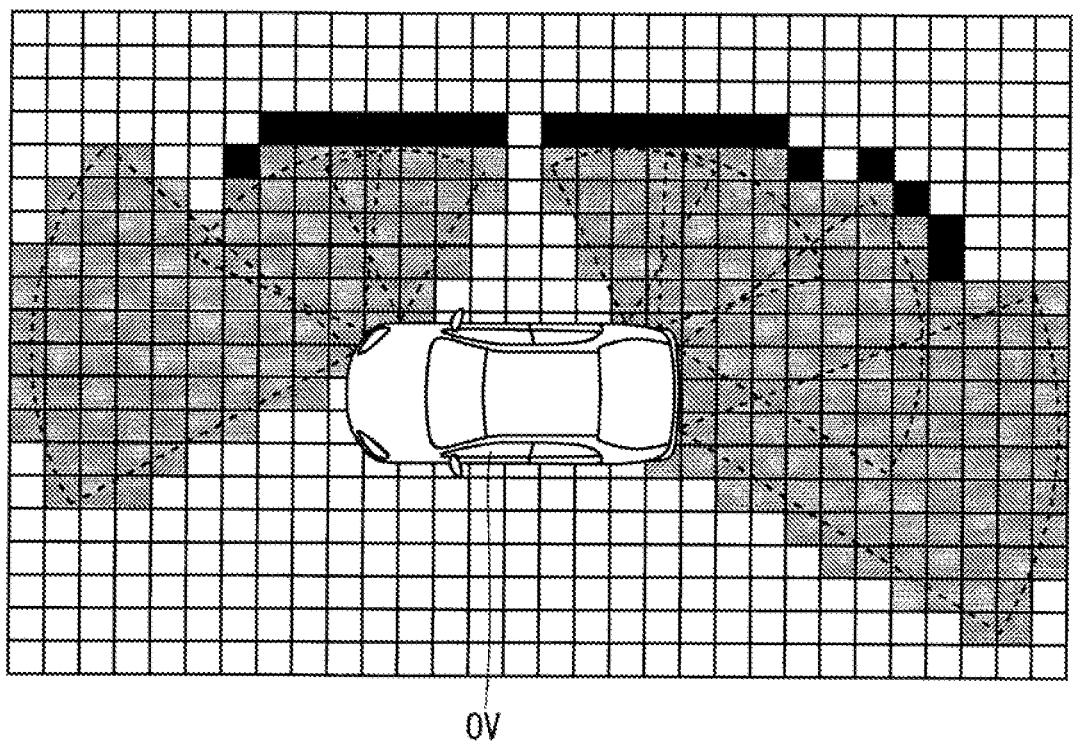
OV

PARKING ASSISTANCE DEVICE AND PARKING ASSISTANCE METHOD

CROSS REFERENCE TO RELATED APPLICATIONS

This application is a National Stage of International Application No. PCT/JP2018/037013 filed Oct. 3, 2018.

TECHNICAL FIELD

The present invention relates to a parking assistance device, and particularly to a parking assistance device capable of a speedy parking.

BACKGROUND ART

For example, in a conventional parking assistance device disclosed in Patent Document 1, an environment recognition part recognizes a surrounding environment of a vehicle to be parked. Next, a parking route generation part generates a traveling route to a parking position determined based on the surrounding environment recognized by the environment recognition part. Subsequently, a travel controller makes the vehicle travel to the parking position along the traveling route generated by the parking route generation part.

The conventional parking assistance device disclosed in Patent Document 1 performs a parking assistance of a vehicle as described hereinafter when a collision prediction part suddenly detects an obstacle on a traveling route in a process that a travel controller makes the vehicle travel along the traveling route, for example.

For example, when the vehicle travels straight along a forward route of the traveling route, the collision prediction part predicts that the vehicle collides with a pedestrian at a point of intersection between the forward route of the vehicle and a forward route of the pedestrian. In accordance with this prediction, the travel controller of the conventional parking assistance device reduces a target speed of the vehicle so that the vehicle stops at a position on the forward route, a predetermined margin distance short of the point of intersection.

Subsequently, the collision prediction part determines the occurrence of the collision between the pedestrian and the vehicle repeatedly. As a result of the determination, when there is no collision between the vehicle and an obstacle including the pedestrian, the travel controller of the vehicle restarts a self-parking.

PRIOR ART DOCUMENTS

Patent Documents

Patent Document 1: Japanese Patent Application Laid-Open No. 2016-185745

SUMMARY

Problem to be Solved by the Invention

As described above, in the conventional parking assistance device, when the collision prediction part suddenly detects the obstacle such as the pedestrian, for example, on the traveling route in the process that the travel controller makes the vehicle travel along the traveling route, there is a problem that the vehicle remains in a stop state until a collision avoidance of the obstacle and the vehicle can be confirmed, and it takes time to finish the parking of the vehicle.

The present invention is therefore has been made to solve problems as described above, and it is an object of the present invention to provide a parking assistance device capable of avoiding a collision between an obstacle and a vehicle when detecting the obstacle around the vehicle in a process of making the vehicle travel along the traveling route, and speedy parking the vehicle in a predetermined parking position.

Means to Solve the Problem

A parking assistance device according to the present invention includes: a surrounding detection part detecting surrounding information of a vehicle which is to be parked to detect a parking space where the vehicle can be parked; a parking route generation part generating a traveling route from a current position of the vehicle to the parking space detected by the surrounding detection part; a travel controller making the vehicle travel to the parking space along the traveling route; an obstacle detection part detecting an obstacle around the vehicle; and a parking route regeneration part generating a new traveling route to avoid a collision between the vehicle and the obstacle and park the vehicle in the parking space when the obstacle detection part detects the obstacle on the traveling route in a case where the travel controller makes the vehicle travel to the parking space along the traveling route, wherein the travel controller makes the vehicle travel along the new traveling route when the new traveling route is generated.

Effects of the Invention

According to the parking assistance device according to the present invention, when the obstacle is detected on the traveling route in the case where the vehicle travels along the traveling route, generated is the new traveling route to avoid the collision between the vehicle and the obstacle and park the vehicle in the parking space, thus the vehicle can be speedy parked in the parking space.

BRIEF DESCRIPTION OF DRAWINGS

FIG. 1 is a function block diagram illustrating a configuration of a parking assistance device of an embodiment 1 according to the present invention.

FIG. 10 is a drawing schematically illustrating generation processing of generating a two-dimensional grid map in a case of using an ultrasonic sensor as a ranging sensor.

DESCRIPTION OF EMBODIMENT(S)

Embodiment 1

Figure 2:
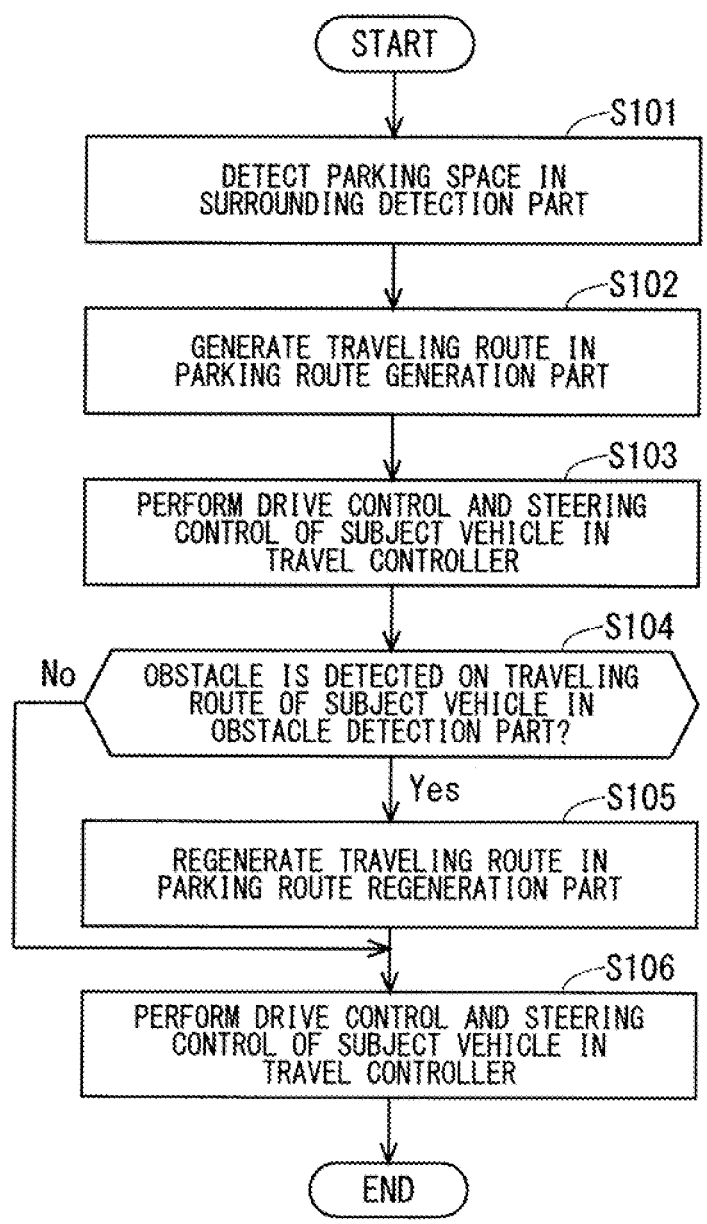
FIG. 2 is a flow chart illustrating parking assistance processing in the parking assistance device of the embodiment 1 according to the present invention.

FIG. 1 is a function block diagram illustrating a configuration of a parking assistance device 100 of an embodiment 1 according to the present invention. As illustrated in FIG. 1, the parking assistance device 100 includes a surrounding detection part 10, a parking route generation part 20, a travel controller 30, an obstacle detection part 40, and a parking route regeneration part 50.

The surrounding detection part 10 detects surrounding information based on a measurement result by one or some of an image sensor taking an image of an area around a subject vehicle (a perimeter monitoring camera including a monocular camera and a stereo camera) and a ranging sensor such as a millimeter-wave radar, a laser radar, and an ultrasonic sensor not shown in the drawings, detects a region where the subject vehicle can be parked, that is to say, a parking space, based on the surrounding information, and inputs the detection result to the parking route generation part 20 and the parking route regeneration part 50.

The parking route generation part 20 generates a parking route which is a traveling route from a current position of the subject vehicle to the parking space based on the parking space detected by the surrounding detection part 10.

Upon receiving a parking assistance start operation performed by a driver, for example, the travel controller 30 performs the parking assistance control such as drive control of controlling an accelerator and a brake and steering control of controlling a steering device so that the subject vehicle travels along the traveling route generated by the parking route generation part 20.

The obstacle detection part 40 detects an obstacle around the subject vehicle based on a measurement result obtained by one or some of an image sensor taking an image of an area around the subject vehicle and a ranging sensor such as a millimeter-wave radar, a laser radar, and an ultrasonic sensor not shown in the drawings.

When the obstacle detection part 40 detects the obstacle on the traveling route of the subject vehicle, the parking route regeneration part 50 generates (regenerates) a new traveling route to avoid a collision between the subject vehicle and the obstacle and park the subject vehicle in a parking space based on the parking space detected by the surrounding detection part 10.

Described next is an operation of the parking assistance device 100 of the present embodiment 1, taking a parking assistance scene of backing and parking the subject vehicle in a parking frame in the parking area as an example.

Figure 3:
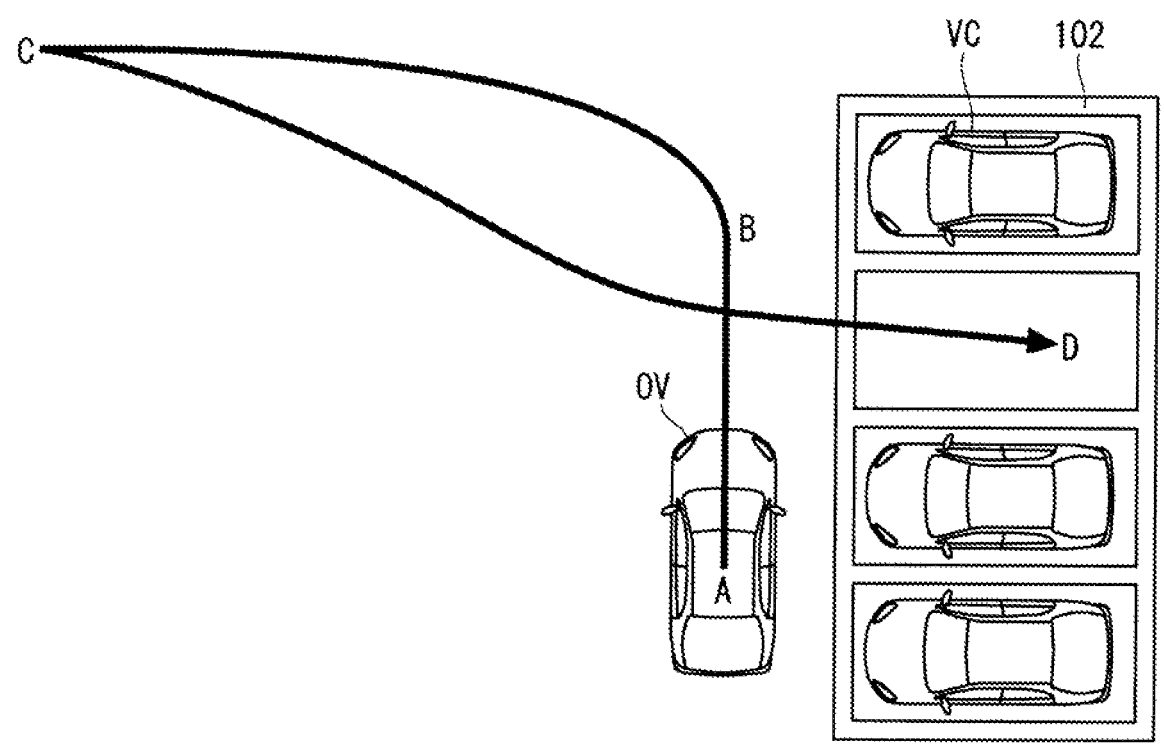
FIG. 3 is a drawing illustrating a traveling route of a subject vehicle in a case where the subject vehicle is parked in a parking space in a parking area divided so that a plurality of vehicles are arranged side by side.

FIG. 2 is a flow chart illustrating parking assistance processing of the parking assistance device 100, and the description hereinafter follows this flow. FIG. 3 is a drawing illustrating a traveling route of a subject vehicle OV in a case where the subject vehicle OV is parked in one parking space in a parking area divided by a parking frame line 102 so that a plurality of vehicles VC are arranged side by side.

Adopted as a traveling route of the subject vehicle OV is that, as indicated by an arrow in FIG. 3, after the subject vehicle OV travels straight from a spot A to a forward spot B located in parallel to an arrangement of the plurality of vehicles VC parallelly parked in the parking frame line 102, the subject vehicle OV makes a curve to the left and then travels straight to proceed to a spot C, and subsequently backs from the spot C in a gentle curve to reach a spot D which is a parking space.

When a driver who intends to park the vehicle performs a predetermined parking assistance start operation, parking assistance processing is started, and the surrounding detection part 10 detects the parking space based on the measurement result obtained by one or some of the various sensors described above while the vehicle travels from the spot A to the spot B illustrated in FIG. 3 by driver's driving (Step S101).

Adoptable as a method of detecting the parking space is a method disclosed in U.S. Pat. No. 6,362,738, for example. That is to say, the surrounding detection part 10 performs a coordinate conversion on a video taken by a perimeter monitoring camera attached to front, back, right, and left sides of the vehicle, for example, as an image sensor taking an image around the subject vehicle so that the subject vehicle is attached to a plane surface of the converted video viewed from above, and performs image processing of joining them to each other to obtain the video around the vehicle.

Then, the surrounding detection part 10 detects the parking space using the obtained video around the vehicle Specifically, when a state where the parking frame line 102 large enough to park the subject vehicle is drawn on a ground is taken sufficiently clearly in the video around the vehicle, the surrounding detection part 10 recognizes that the parking frame line 102 is the parking space. Alternatively, when a state where the other vehicles are parked with an interval where the subject vehicle can be parked is taken sufficiently clearly in the video around the vehicle, the surrounding detection part 10 recognizes that the interval between the parked vehicles is a parking slot. For example, Japanese Patent Application Laid-Open No. 2017-88112 discloses a method of detecting a parking space using a measurement result obtained by an ultrasonic sensor as a method of detecting a parking space, however, the method of detecting the parking lot is not particularly limited.

The driver makes the vehicle proceed from the spot B to the spot C, and stops the vehicle at the spot C to back and park the vehicle in the parking space detected by the surrounding detection part 10. At this time, when the driver performs a predetermined parking assistance start operation again, the spot C becomes a parking assistance start position, and the parking route generation part 20 generates the traveling route from the spot C to the spot D based on the parking space detected by the surrounding detection part 10 (Step S102).

Herein, the traveling route indicates a trajectory (curvature) from the spot C to the spot D in FIG. 3. A known technique can be used as the method of generating the traveling route, and the traveling route (curvature) can be generated using techniques disclosed in Japanese Patent Application Laid-Open No. 2017-88112 and U.S. Pat. No. 6,124,977, for example, however, the method of generating the traveling route is not particularly limited.

When the traveling route is generated, the obstacle detection part 40 detects presence or absence of the obstacle around the subject vehicle, and when the obstacle detection part 40 detects the obstacle, the traveling route is generated to avoid the collision with the obstacle. The obstacle detection part 40 is further described hereinafter.

After the parking route generation part 20 generates the traveling route, the travel controller 30 performs drive control and steering control of the subject vehicle so that the subject vehicle follows the traveling route generated by the parking route generation part 20 (Step S103).

The obstacle detection part 40 detects the presence or absence of the obstacle around the subject vehicle during the drive control and the steering control to follow the traveling route, and determines the presence or absence of the obstacle on the traveling route of the subject vehicle (Step S104). Examples of the sensor detecting the obstacle include, as described above, an image sensor taking an image of an area around the subject vehicle and a ranging sensor such as a millimeter-wave radar, a laser radar, and an ultrasonic sensor, however, the sensor is not limited thereto, but any sensor which can detect the obstacle on the traveling route of the subject vehicle is applicable.

When the obstacle detection part 40 detects the obstacle on the traveling route of the subject vehicle in Step S104 (in a case of Yes), the parking route regeneration part 50 generates the traveling route to avoid the collision between the subject vehicle and the obstacle and park the subject vehicle in the parking space based on the parking space detected by the surrounding detection part 10 (Step S105).

In the meanwhile, when the obstacle detection part 40 does not detect the obstacle on the traveling route of the subject vehicle in Step S104 (in a case of No), the process proceeds with Step S106, and the travel controller 30 performs the drive control and the steering control of the subject vehicle so that the subject vehicle follows the traveling route generated by the parking route generation part 20.

When the obstacle detection part 40 detects the obstacle on the traveling route of the subject vehicle, the travel controller 30 receives information of a position of the obstacle and a distance to the obstacle, for example, from the obstacle detection part 40, and stops the subject vehicle. Then, the travel controller 30 obtains a new traveling route generated from the parking route regeneration part 50 while the subject vehicle is stopped, and performs the drive control and the steering control of the subject vehicle so that the subject vehicle follows the new traveling route (Step S106).

The processing subsequent to Step S104 described above is executed repeatedly until the subject vehicle is parked in the parking space.

Described next using FIG. 4 to FIG. 14 is an example of an avoidance operation of avoiding the obstacle performed by the obstacle detection part 40, the parking route regeneration part 50, and the travel controller 30.

Figure 4:
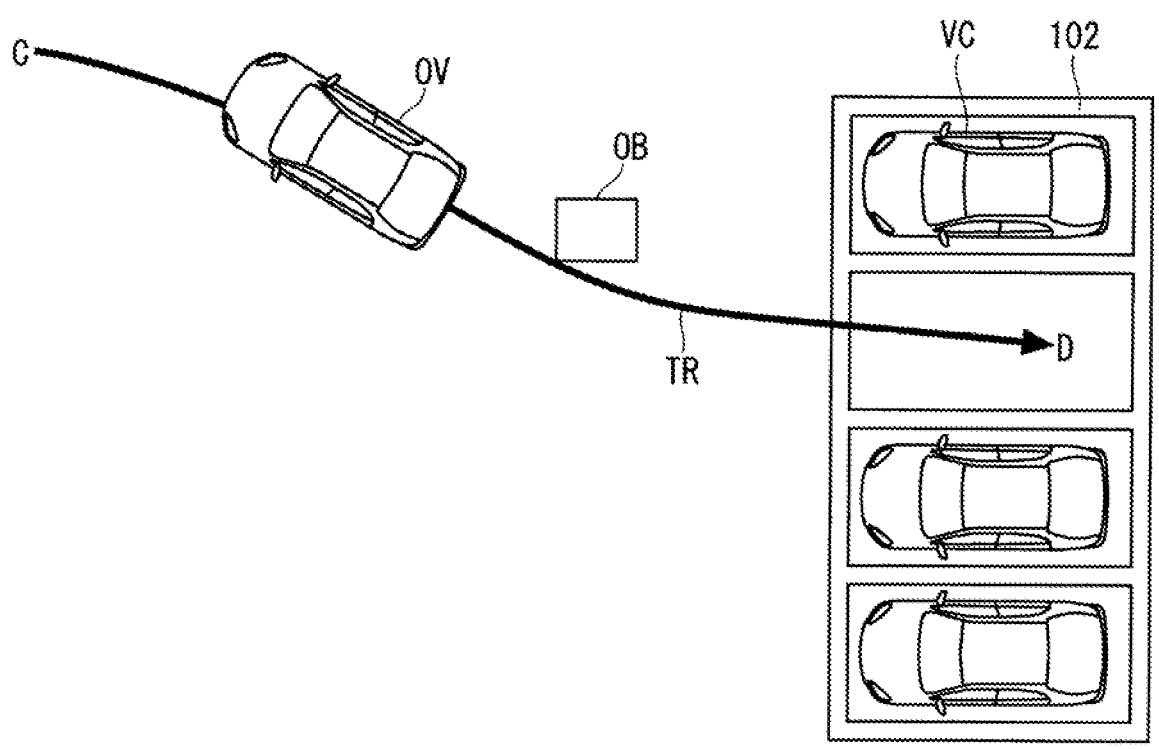
FIG. 4 is a drawing illustrating a state where an obstacle suddenly appears in back of the subject vehicle during the parking assistance.

FIG. 4 illustrates a state where an obstacle OB suddenly appears in back of the subject vehicle OV during the parking assistance from the spot C to the spot D illustrated in FIG. 3.

The obstacle detection part 40 detects how the obstacle is located on a road surface based on a ranging value obtained by a ranging sensor, that is to say, a distance from the subject vehicle OV to the obstacle OB using a two-dimensional grid type map (referred to as a two-dimensional grid map hereinafter). An example of generation processing of generating the two-dimensional grid map is described hereinafter using FIG. 5 to FIG. 10.

Figure 5:
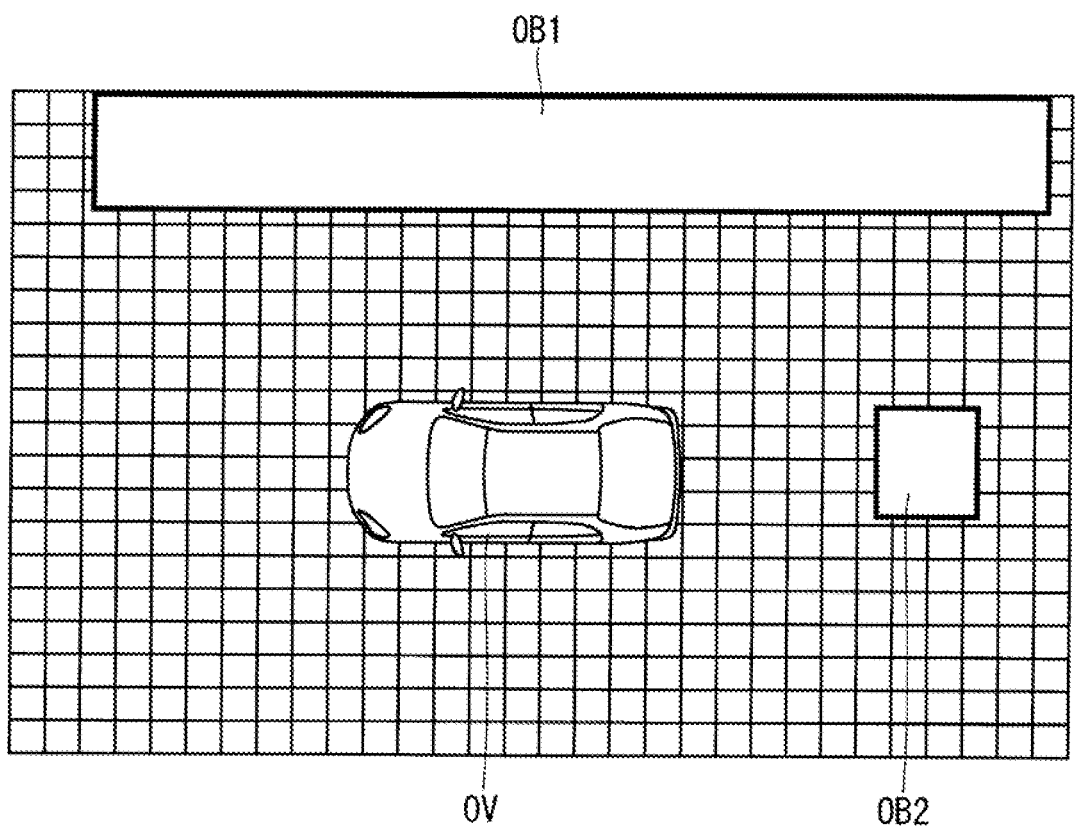
FIG. 5 is a drawing schematically illustrating a surrounding state where there are two obstacles.
Figure 6:
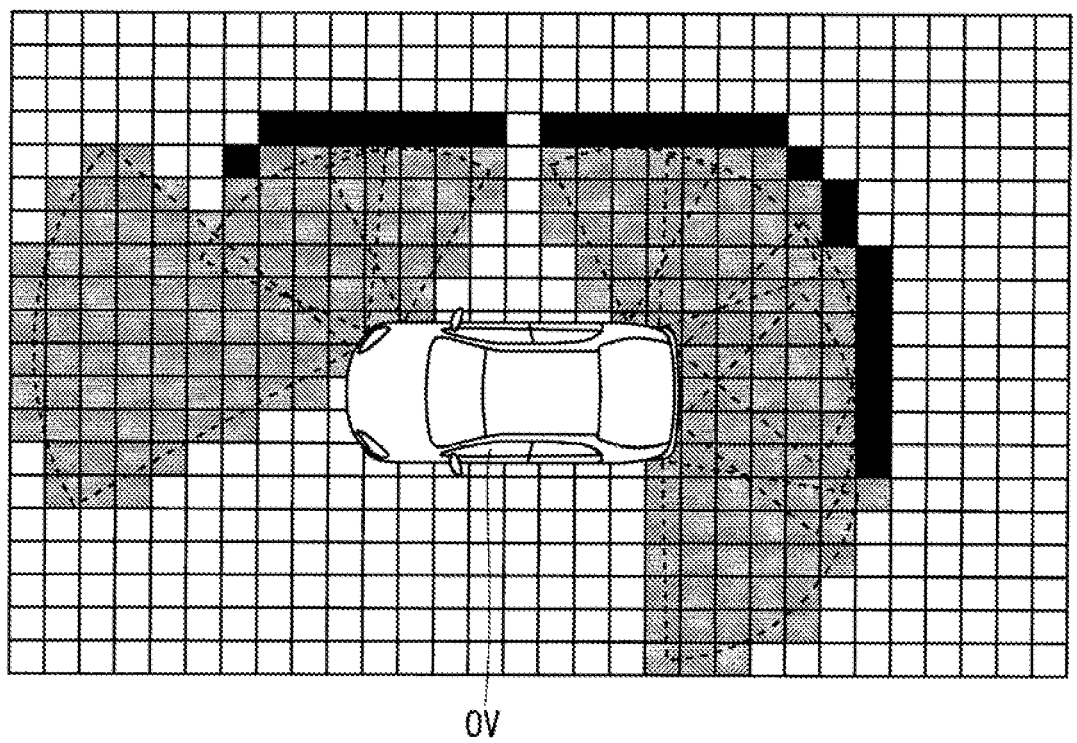
FIG. 6 is a drawing schematically illustrating generation processing of generating a two-dimensional grid map in a case of using an ultrasonic sensor as a ranging sensor.

FIG. 5 is a drawing schematically illustrating a surrounding state where there are two obstacles OB1 and OB2, and FIG. 6 is a drawing schematically illustrating generation processing of generating a two-dimensional grid map in a case of using an ultrasonic sensor as the ranging sensor in the surrounding state in FIG. 5.

As illustrated in FIG. 5, the obstacle OB1 longer than the subject vehicle OV is located in parallel to the subject vehicle OV, and the obstacle OB2 smaller than the subject vehicle OV is located in back of the subject vehicle OV. A processing region including the subject vehicle OV and the obstacles OB1 and OB2 are sectioned by grids, and constitutes a two-dimensional grid map. A numeral value of reliability described hereinafter is preset in each grid.

The ultrasonic sensor irradiates an object to be detected with a transmission wave, and receives a reflected wave, which is reflected by a position of a reflection point on the object, with a shortest distance to the object, thereby performing signal processing based on a time difference with the transmission wave, and determines the distance to the object to be a ranging sensor detection distance. In this case, only the distance to the object can be obtained by the ranging sensor, so that a direction of the object is not detected.

Thus, a plurality of ultrasonic sensors are disposed on each unit of the vehicle to generate the two-dimensional grid map on an assumption that a ranging sensor detection range is a range spreading out in a fan-like form from a position where the ranging sensor is attached as illustrated in FIG. 6, thus a two-dimensional position of the object is detected.

The generation processing of generating the two-dimensional grid map is described hereinafter. As described above, the ranging sensor detection distance is obtained as the shortest distance to the object, thus reliability of grids on the two-dimensional map with which a circular arc of the fan-like ranging sensor detection range having a radius equal to the ranging sensor detection distance has contact, that is to say, black grids in FIG. 6 is increased. That is to say, a numeral value of reliability, that is 40, for example, is preset for each grid, and an optional value is added to increase the numeral value to 100 at a maximum, for example.

It is considered that there is no object within the ranging sensor detection distance, thus the reliability of grids within the ranging sensor detection range, that is to say, grids provided with a sandy hatching in FIG. 6 is reduced. That is to say, an optional value is subtracted so that a numeral value of the reliability which is preset for each grid, that is 40, for example, is reduced to 0 at a minimum.

In FIG. 6, a range detected by a ranging sensor which has not detected the obstacles OB1 and OB2 is also indicated by a fan-like range, and a circular arc of the range indicates a maximum detection distance of the ranging sensor.

As described above, the generation processing of generating the two-dimensional grid map is processing of repeatedly adding and subtracting the reliability of each grid based on the ranging sensor detection distance. As a result of this processing, when a grid having the reliability equal to or larger than a predetermined threshold value is a grid having the obstacle, and a grid having the reliability smaller than the threshold value is a grid having no obstacle. This threshold value can be optionally set, thus when the maximum value of the reliability is 100 as described above, the threshold value is set to 80, for example.

In the method of determining the present or absence of the obstacle using the two-dimensional grid map in such a manner, the value of the reliability, the value to be added and subtracted, an upper limit value and a lower limit value of the reliability which are preset to the grid are not limited thereto described above, and the method of calculating the reliability of the grid is not also limited to addition and subtraction. Any method is applicable as long as the presence or absence of the obstacle can be determined.

Figure 7:
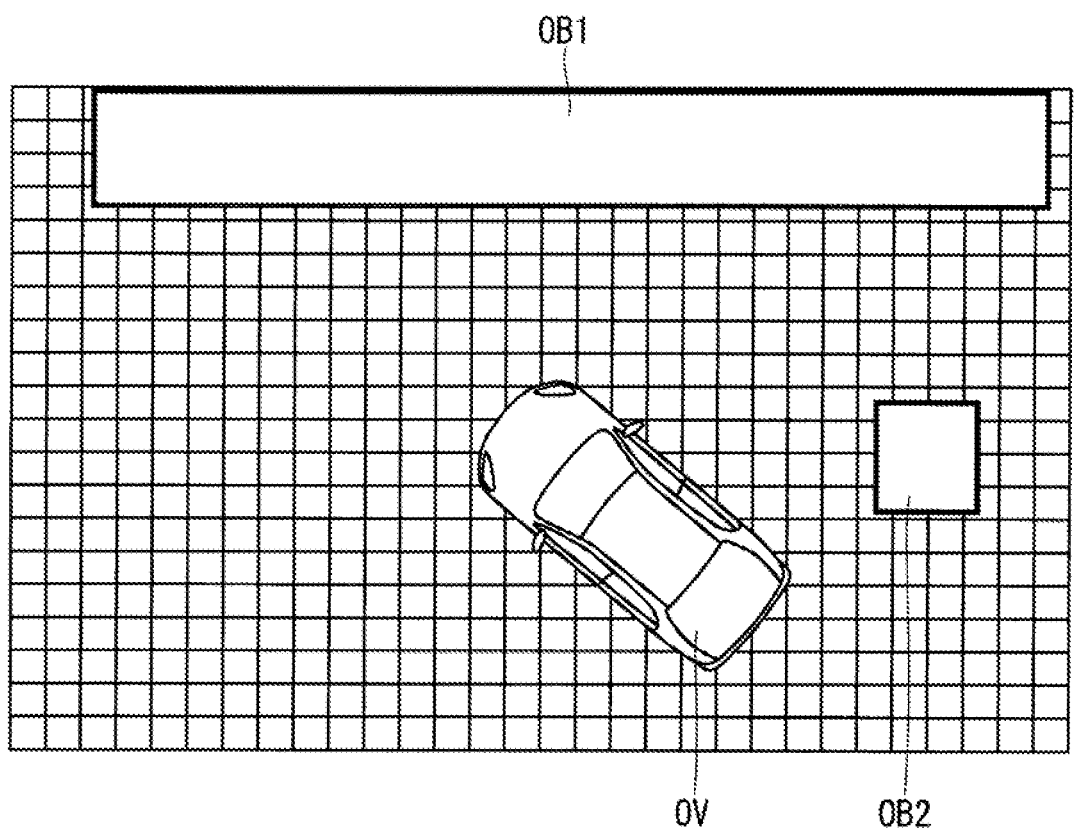
FIG. 7 is a drawing schematically illustrating a surrounding state where the subject vehicle travels diagonally backward left.
Figure 8:
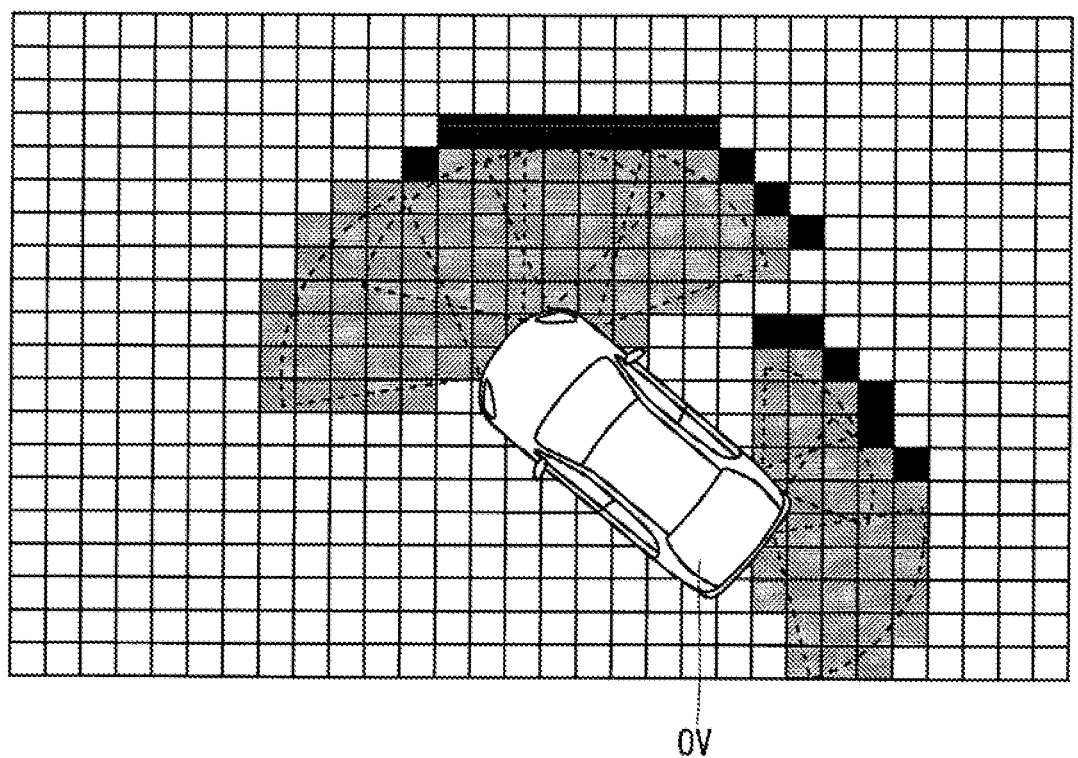
FIG. 8 is a drawing schematically illustrating generation processing of generating a two-dimensional grid map in a case of using an ultrasonic sensor as a ranging sensor.

FIG. 7 is a drawing schematically illustrating a surrounding state where the subject vehicle OV travels diagonally backward left from the state illustrated in FIG. 5, and FIG. 8 is a drawing schematically illustrating generation processing of generating a two-dimensional grid map in a case of using an ultrasonic sensor as the ranging sensor in the surrounding state in FIG. 7.

As illustrated in FIG. 8, even when the subject vehicle OV changes a position and a direction thereof, the reliability of each grid in the two-dimensional grid map is updated, thus the grid having high reliability can be specified to detect the obstacle.

Figure 9:
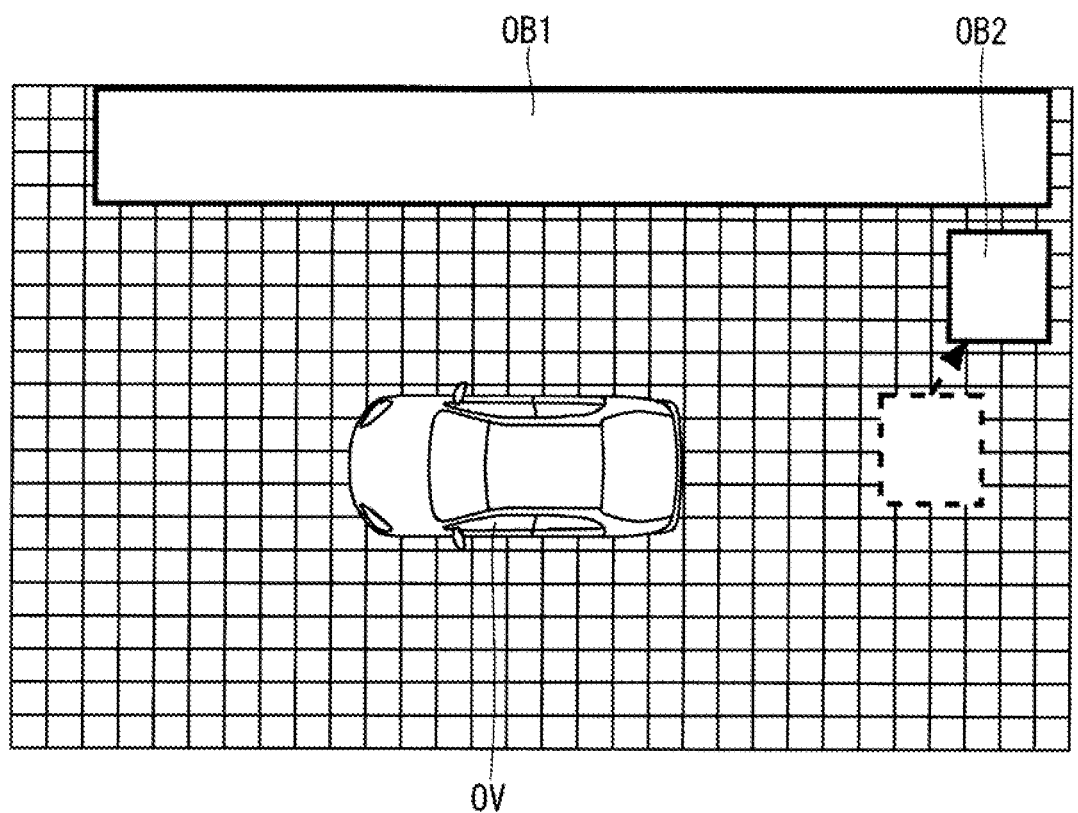
FIG. 9 is a drawing schematically illustrating a surrounding state where the obstacle has moved.

In the two-dimensional grid map, the obstacle can be detected even when not only the subject vehicle but also the obstacle travels. FIG. 9 is a drawing schematically illustrating a surrounding state where the obstacle OB2 travels diagonally upward right from the state illustrated in FIG. 5, and FIG. 10 is a drawing schematically illustrating generation processing of generating a two-dimensional grid map in a case of using an ultrasonic sensor as the ranging sensor in the surrounding state in FIG. 9.

As illustrated in FIG. 10, even when the obstacle OB2 changes a position and a direction thereof, the reliability of each grid in the two-dimensional grid map is updated, thus the grid having high reliability can be specified to detect the traveling of the obstacle.

When the obstacle detection part 40 determines that there is no obstacle on the traveling route, the travel controller 30 determines a target vehicle speed and a target steering angle so that the vehicle travels along the traveling route generated by the parking route generation part 20, outputs the target steering angle to a steering device to perform steering control, and outputs the target vehicle speed to a drive device to perform drive control.

Figure 11:
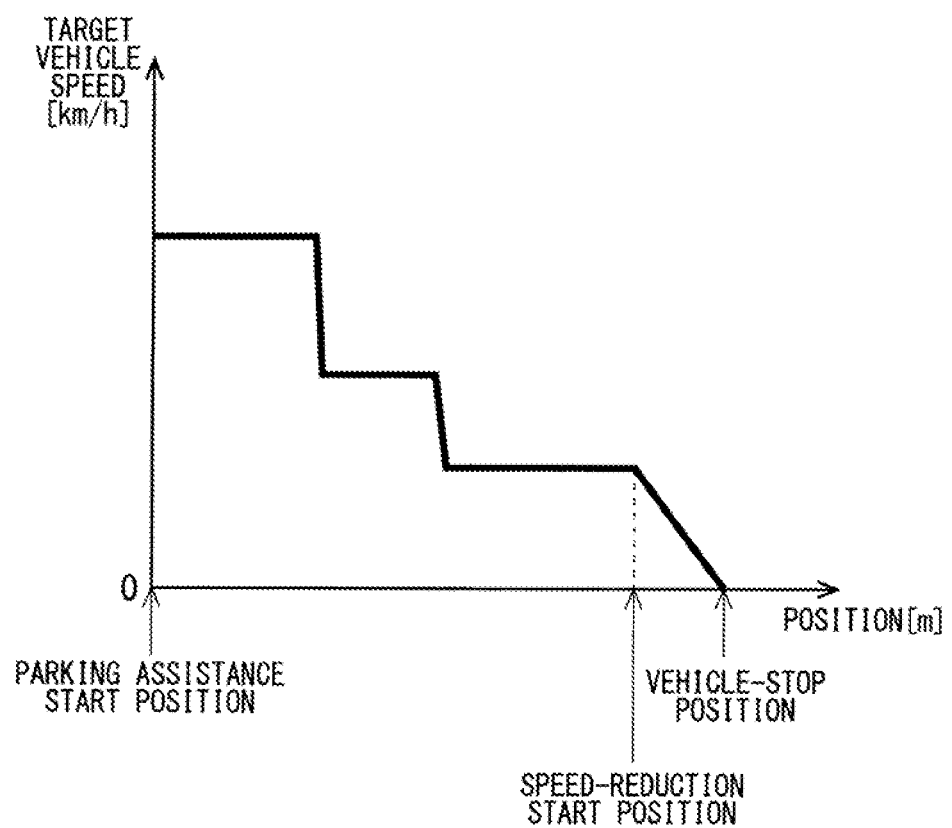
FIG. 11 is a drawing illustrating an example of a target vehicle speed control in a case where there is no obstacle on the traveling route.

FIG. 11 is a drawing illustrating an example of a target vehicle speed control performed by the travel controller 30 in a case where the obstacle detection part 40 determines that there is no obstacle on the traveling route of the subject vehicle OV.

A lateral axis in FIG. 11 indicates a position (m) along the traveling route, and a vertical axis indicates a target vehicle speed (km/h) at the position. A left end of the lateral axis is a parking assistance start position at the spot C illustrated in FIG. 3.

The travel controller 30 controls the target vehicle speed in accordance with a distance to a vehicle-stop position at the spot D illustrated in FIG. 3, gradually reduces the target vehicle speed from a speed-reduction start position before the vehicle-stop position, and stops the subject vehicle OV at the vehicle-stop position. In this case, it is sufficient that the speed-reduction start position is a position optionally preset such as a position Xm short of the vehicle-stop position, for example. It is sufficient that a value obtained in a step of generating the traveling route from the spot C to the spot D by the parking route generation part 20 is used as a distance from the spot C to the spot D.

In the meanwhile, when the obstacle OB suddenly appears on a traveling route TR and the object detection part 40 determines that there is the obstacle on the traveling route as illustrated in FIG. 4, the travel controller 30 stops the subject vehicle OV in a suspended position, a predetermined distance short of the obstacle OB as illustrated in FIG. 4, thus the collision with the obstacle OB can be avoided.

Figure 12:
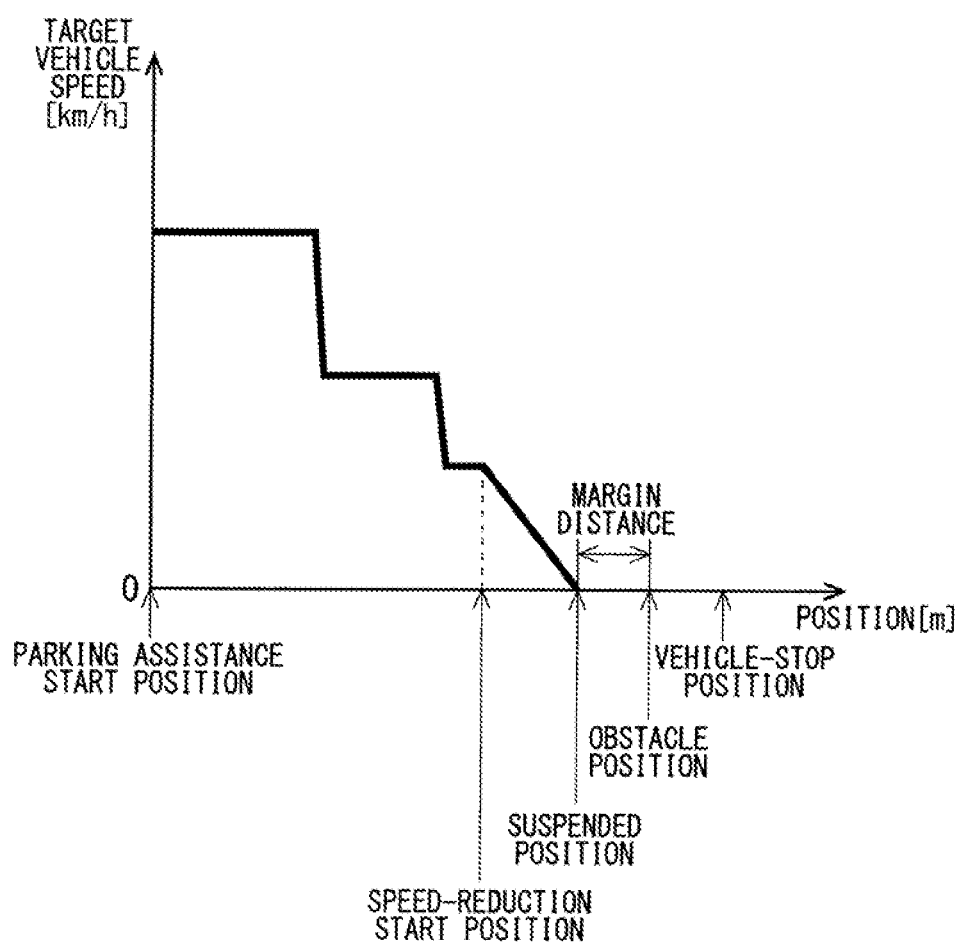
FIG. 12 is a drawing illustrating an example of a target vehicle speed control in a case where there is an obstacle on the traveling route.

FIG. 12 is a drawing illustrating an example of a target vehicle speed control performed by the travel controller 30 in a case where the obstacle suddenly appears on the traveling route of the subject vehicle OV.

A lateral axis in FIG. 12 indicates a position (m) along the traveling route, and a vertical axis indicates a target vehicle speed (km/h) at the position. A left end of the lateral axis is a parking assistance start position at the spot C illustrated in FIG. 12.

The travel controller 30 reduces the target vehicle speed to stop the subject vehicle OV in a suspended position, an optionally-set margin distance short of a position of the obstacle.

Figure 13:
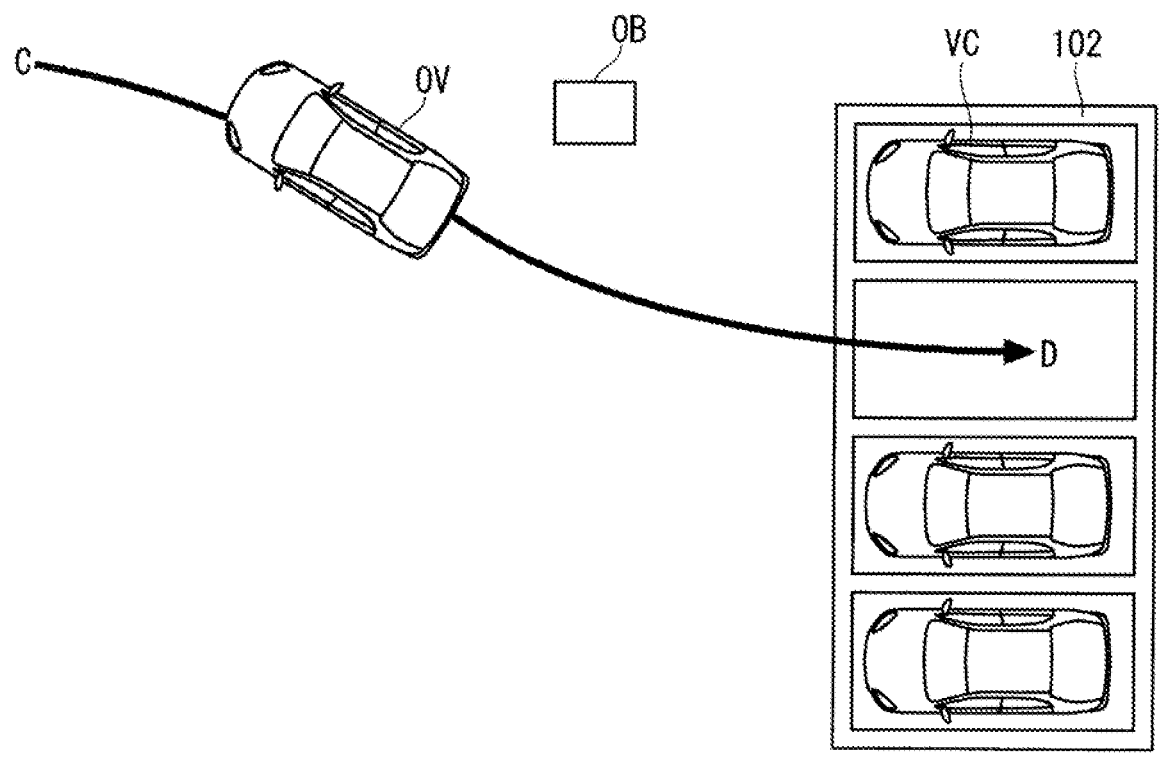
FIG. 13 is a drawing illustrating a state where the obstacle gets out of the traveling route after a suspended state of the subject vehicle.

FIG. 13 is a drawing illustrating a state where the obstacle OB gets out of the traveling route TR after a suspended state of the subject vehicle OV in FIG. 4. As illustrated in FIG. 13, when the obstacle OB gets out of the traveling route TR and the two-dimensional grid map is thereby updated as illustrated in FIG. 10, the obstacle detection part 40 determines that there is no obstacle on the traveling route.

When the obstacle detection part 40 determines that there is no obstacle on the traveling route, the travel controller 30 outputs the target steering angle to the steering device again so that the vehicle travels along the traveling route generated by the parking route generation part 20, and outputs the target vehicle speed to the drive device again, thereby starting the parking assistance again.

In the meanwhile, when the obstacle remains on the traveling route and the subject vehicle continues the stop state, the parking route regeneration part 50 starts the processing of generating the new traveling route to avoid the obstacle a predetermined period of time, for example, three seconds after the stop state of the subject vehicle, thus a time required for finishing the parking of the vehicle can be reduced.

Figure 14:
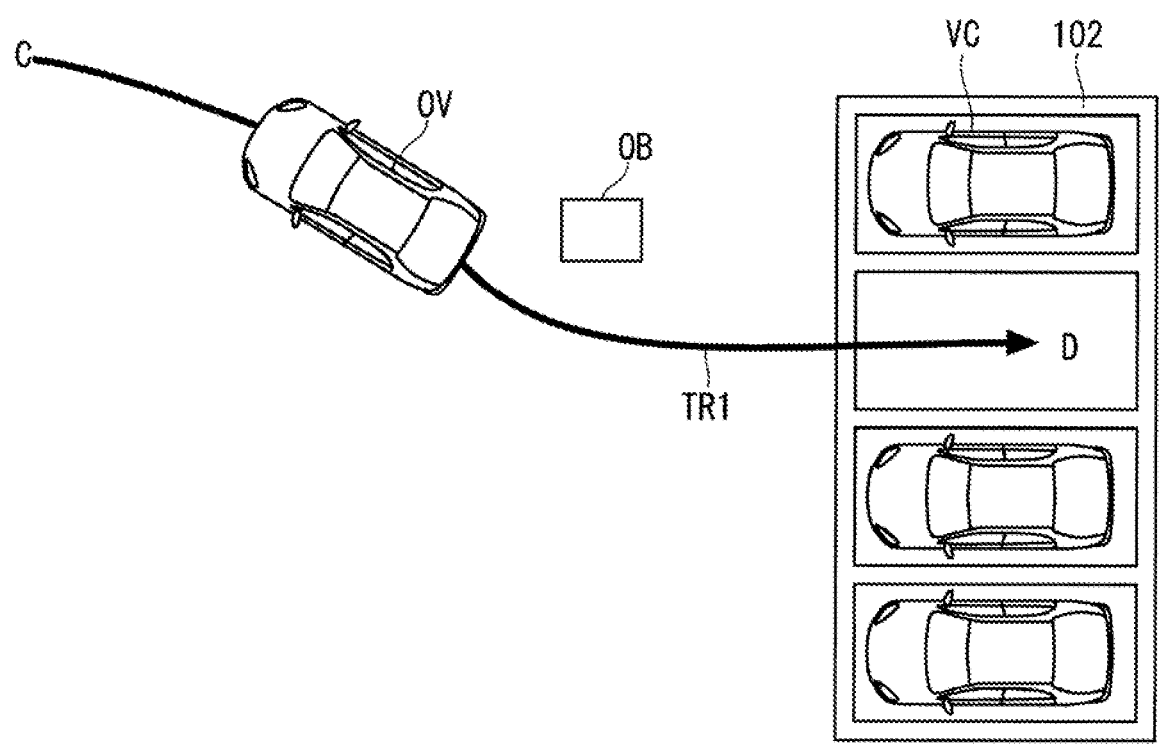
FIG. 14 is a drawing illustrating a state of performing a parking assistance by a generated new traveling route.

FIG. 14 illustrates a state of performing a parking assistance by a new traveling route TR1 which has been generated, and the new traveling route TR1 illustrated in FIG. 14 is generated to avoid the collision with the obstacle, have a small target steering angle in terms of a ride quality, and avoid a stationary steering.

The travel controller 30 outputs the target steering angle to the steering device so that the vehicle travels along the traveling route generated by the parking route regeneration part 50, and outputs the target vehicle speed to the drive device, thereby starting the parking assistance again. Accordingly, the vehicle can be speedy parked in the parking space.

Modification Example 1

Figure 15:
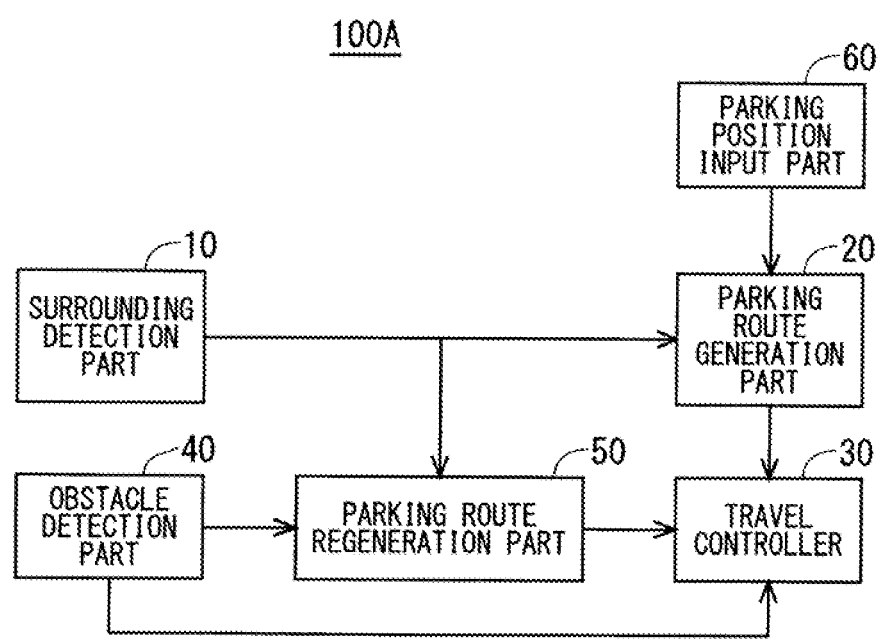
FIG. 15 is a function block diagram illustrating a configuration of a parking assistance device of a modification example 1 of the embodiment 1 according to the present invention.

FIG. 15 is a function block diagram illustrating a configuration of a parking assistance device 100A of a modification example 1 of the embodiment 1 according to the present invention. In FIG. 15, the same reference numerals are assigned to the same constituent elements as those of the parking assistance device 100 described using FIG. 1, and the repetitive description is omitted.

As illustrated in FIG. 15, the parking assistance device 100A includes, in addition to the configuration of the parking assistance device 100 described using FIG. 1, a parking position input part 60 through which a user can select a parking space of a vehicle when the parking space can be selected in a case where there are parking spaces in a plurality of areas or when there is a wide parking space where a plurality of vehicles can be parked.

The parking position input part 60 is connected to the parking route generation part 20. In generating the traveling route, when the parking space is selected through the parking position input part 60, the parking route generation part 20 generates the traveling route from a current position of the subject vehicle to the parking space based on the parking space.

As described above, when the surrounding detection part 10 detects the parking space, the surrounding detection part 10 obtains the video around the vehicle, in which the subject vehicle is viewed from above, by image processing using the video obtained by the image sensor. When the video around the vehicle is displayed on a display device with a touch panel function provided in the parking position input part 60 having a human machine interface (HMI) function, the user touches a desired parking space in the displayed video around the vehicle, thereby being able to set the parking space of the vehicle. Thus, the user can select the parking space according to preference of the user, and convenience of the user can be achieved.

It is sufficient that this operation is performed at a stage that the subject vehicle travels to the spot C illustrated in FIG. 3, and then the user such as a driver performs a predetermined parking assistance start operation to display the video around the vehicle on the display device with the touch panel function provided in the parking position input part 60, for example.

In the above description, the parking position input part 60 has the HMI function, and the user operates the touch panel to select the parking space for the vehicle, however, the method of selecting the parking space is not limited thereto as long as the parking space can be selected.

Modification Example 2

Figure 16:
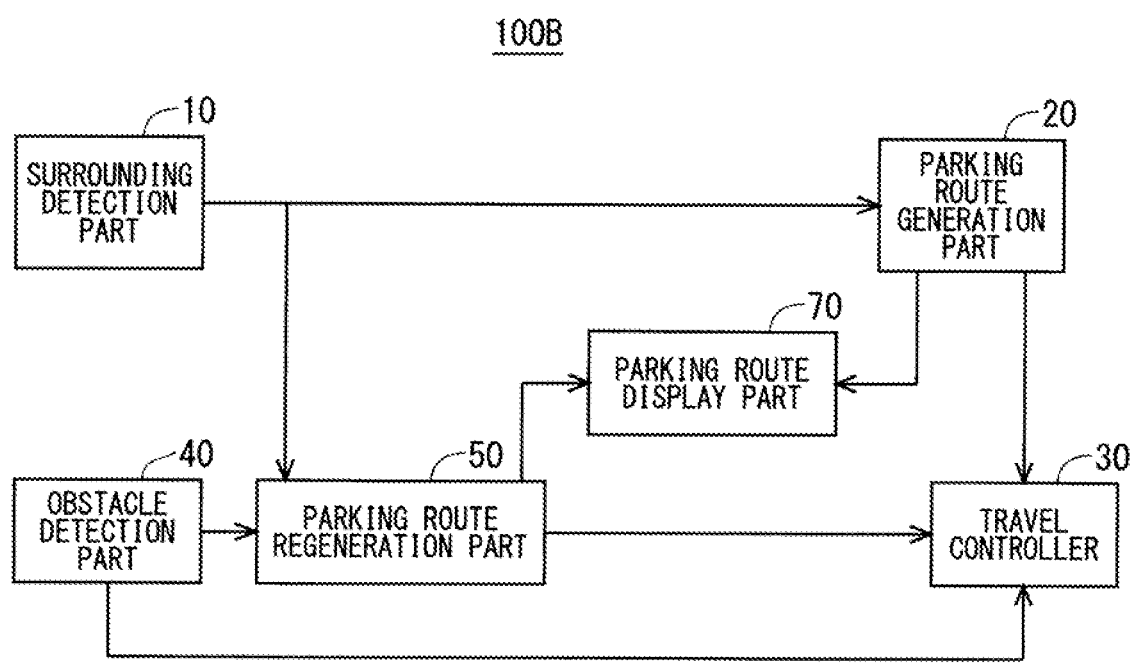
FIG. 16 is a function block diagram illustrating a configuration of a parking assistance device of a modification example 2 of the embodiment 1 according to the present invention.

FIG. 16 is a function block diagram illustrating a configuration of a parking assistance device 100B of a modification example 2 of the embodiment 1 according to the present invention. In FIG. 16, the same reference numerals are assigned to the same constituent elements as those of the parking assistance device 100 described using FIG. 1, and the repetitive description is omitted.

As illustrated in FIG. 16, the parking assistance device 100B includes a parking route display part 70 displaying the traveling route in addition to the configuration of the parking assistance device 100 described using FIG. 1. The parking route display part 70 is connected to the parking route regeneration part 50 and the parking route generation part 20.

A new traveling route generated by the parking route regeneration part 50 and a traveling route generated by the parking route generation part 20 are displayed on a display device with a touch panel function provided on the parking route display part 70 having a function of HMI, thus a user can be notified of the traveling route.

As described above, when the surrounding detection part 10 detects the parking space, the surrounding detection part 10 obtains the video around the vehicle, in which the subject vehicle is viewed from above, by image processing using the video obtained by the image sensor. Thus, the traveling route can be overlapped with the video around the vehicle and displayed. The user such as the driver can confirm the traveling route, and perform a selection of giving permission through the touch panel if there is no problem, thus safety can be increased.

In the above description, the parking route display part 70 has the HMI function, and the user operates the touch panel to give permission of the traveling route, however, the parking route display part 70 may not have the HMI function as long as it can display the traveling route.

The parking route display part 70 may double as the display device with the touch panel function of the parking position input part 60 described using FIG. 16.

Embodiment 2

Figure 17:
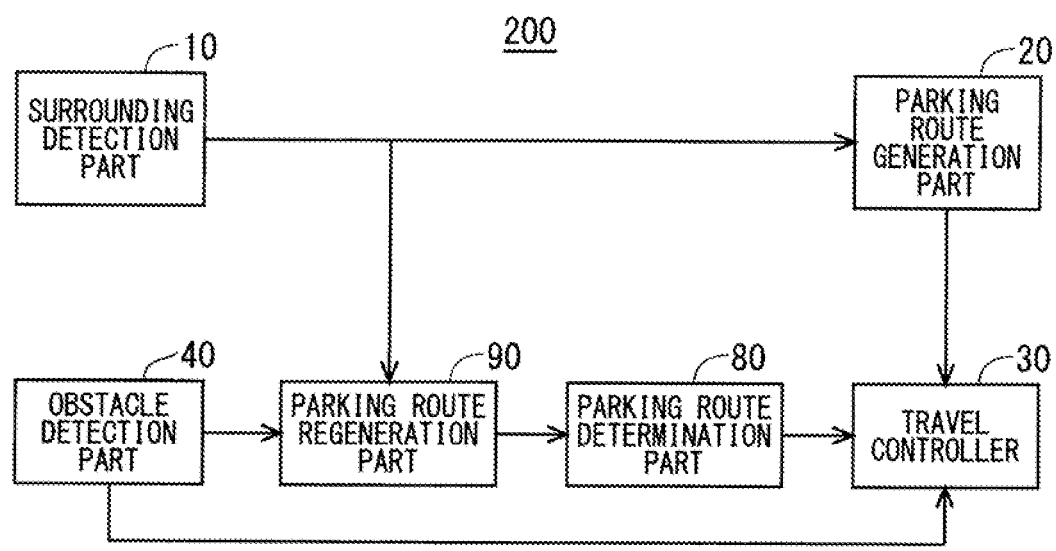
FIG. 17 is a function block diagram illustrating a configuration of a parking assistance device of an embodiment 2 according to the present invention.

FIG. 17 is a function block diagram illustrating a configuration of a parking assistance device 200 of an embodiment 2 according to the present invention. In FIG. 17, the same reference numerals are assigned to the same constituent elements as those of the parking assistance device 100 described using FIG. 1, and the repetitive description is omitted.

As illustrated in FIG. 17, the parking assistance device 200 includes a parking route regeneration part 90 in place of the parking route regeneration part 50 of the parking assistance device 100 described using FIG. 1. The parking route regeneration part 90 generates a plurality of traveling routes to avoid the collision between the subject vehicle and the obstacle when the obstacle detection part 40 detects the obstacle on the traveling route of the subject vehicle, and to have a small target steering angle and avoid a stationary steering on a plurality of parking spaces or a wide parking space when there are the parking spaces in a plurality of areas or when there is a wide parking space where a plurality of vehicles can be parked. In addition to the configuration of the parking assistance device 100 described using FIG. 1, the parking assistance device 200 includes a parking route determination part 80 selecting a traveling route having a smallest target steering angle from the plurality of traveling routes generated by the parking route regeneration part 90, thereby determining a new traveling route.

Described next is an operation of the parking assistance device 200 of the present embodiment 2, taking a parking assistance scene of backing and parking the subject vehicle in a parking frame in the parking area as an example.

Figure 18:
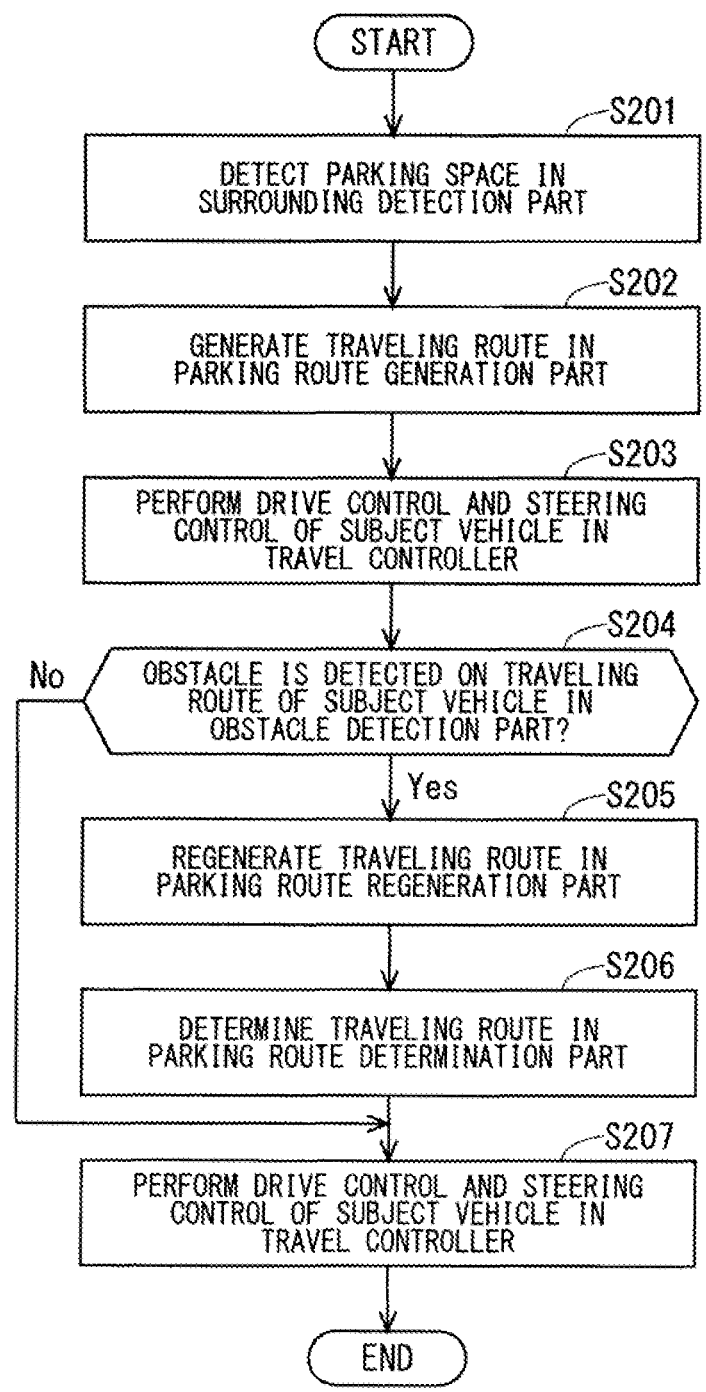
FIG. 18 is a flow chart illustrating parking assistance processing in the parking assistance device of the embodiment 2 according to the present invention.
Figure 19:
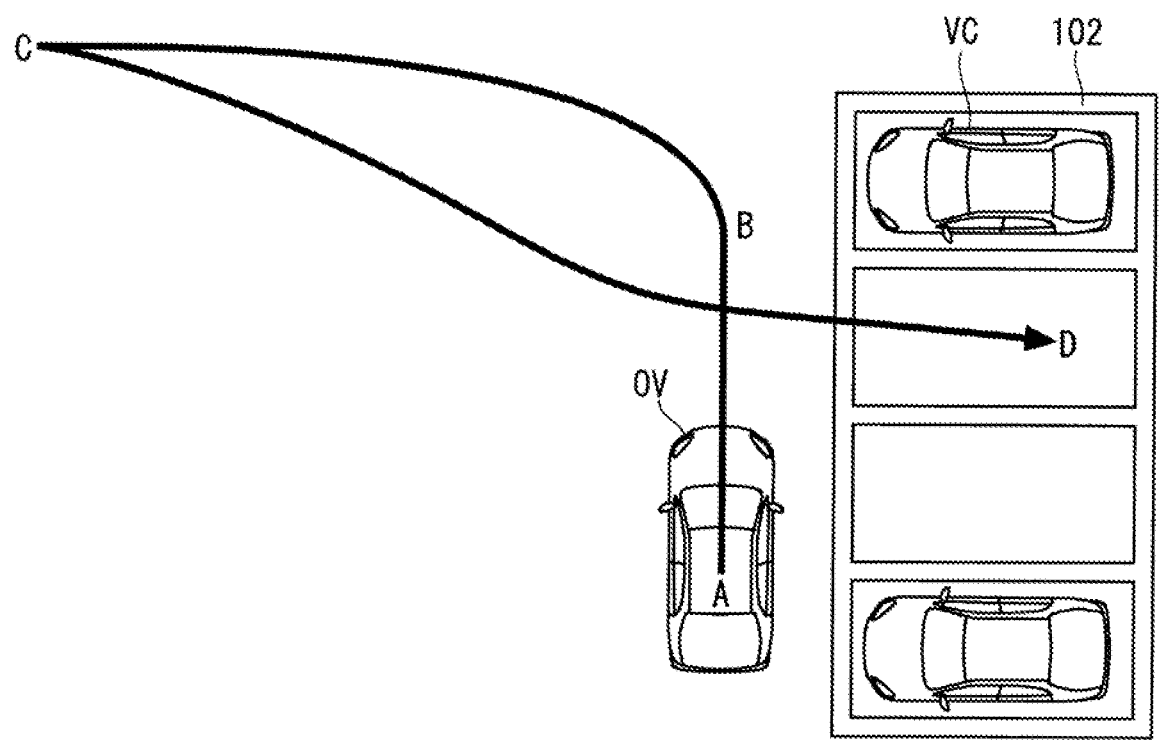
FIG. 19 is a drawing illustrating a traveling route of a subject vehicle in a case where the subject vehicle is parked in one of two parking spaces in a parking area divided so that a plurality of vehicles are arranged side by side.

FIG. 18 is a flow chart illustrating parking assistance processing of the parking assistance device 200, and the description hereinafter follows this flow. FIG. 19 is a drawing illustrating a traveling route of the subject vehicle OV in a case where the subject vehicle OV is parked in one of two parking spaces in a parking area divided by the parking frame line 102 so that the plurality of vehicles VC are arranged side by side.

Adopted as a traveling route of the subject vehicle OV is that, as indicated by an arrow in FIG. 19, after the subject vehicle OV travels straight from the spot A to the forward spot B located in parallel to the arrangement of the plurality of vehicles VC parallelly parked in the parking frame line 102, the subject vehicle OV takes a curve to the left and then travels straight to proceed to the spot C, and subsequently backs from the spot C in a gentle curve to reach the spot D which is the parking space.

In the flow chart illustrated in FIG. 18, operations in Steps S201 to S204 are basically the same as those in Steps S101 to S104 in the flow chart in the embodiment 1 illustrated in FIG. 2, thus the description is omitted. However, the surrounding detection part 10 detects the plurality of parking spaces in Step S201, and the parking route generation part 20 generates the traveling route for the parking space with the small target steering angle where the vehicle can be easily parked in the plurality of parking spaces detected by the surrounding detection part 10 in Step S202.

When a driver who intends to park the vehicle performs a predetermined parking assistance start operation, parking assistance processing is started. After Steps S201 to S204, when the obstacle detection part 40 detects that there is the obstacle on the traveling route of the subject vehicle in Step S204 (in a case of Yes), the parking route regeneration part 90 generates (regenerates) the traveling route for parking the subject vehicle in the parking space while avoiding the collision between the subject vehicle and the obstacle based on the parking space detected by the surrounding detection part 10 (Step S205). In this case, the plurality of parking spaces are detected, the parking route regeneration part 90 generates the plurality of traveling routes with the small target steering angle to avoid the stationary steering for the plurality of parking spaces detected by the surrounding detection part 10.

The parking route determination part 80 selects the traveling route having the smallest target steering angle from the plurality of traveling routes generated by the parking route regeneration part 90, thereby determining the new traveling route (Step S206).

In the meanwhile, when the obstacle detection part 40 does not detect the obstacle on the traveling route of the subject vehicle in Step S204 (in the case of No), the process proceeds with Step S207, and the travel controller 30 performs the drive control and the steering control of the subject vehicle so that the subject vehicle follows the traveling route generated by the parking route generation part 20.

When the obstacle detection part 40 detects the obstacle on the traveling route of the subject vehicle, the travel controller 30 receives information of a position of the obstacle and a distance to the obstacle or the like from the obstacle detection part 40, and stops the subject vehicle. Then, the travel controller 30 obtains a new traveling route generated from the parking route determination part 80 while the subject vehicle is stopped, and performs the drive control and the steering control of the subject vehicle so that the subject vehicle follows the new traveling route (Step S207).

The processing subsequent to Step S204 described above is executed repeatedly until the subject vehicle is parked in the parking space.

Figure 20:
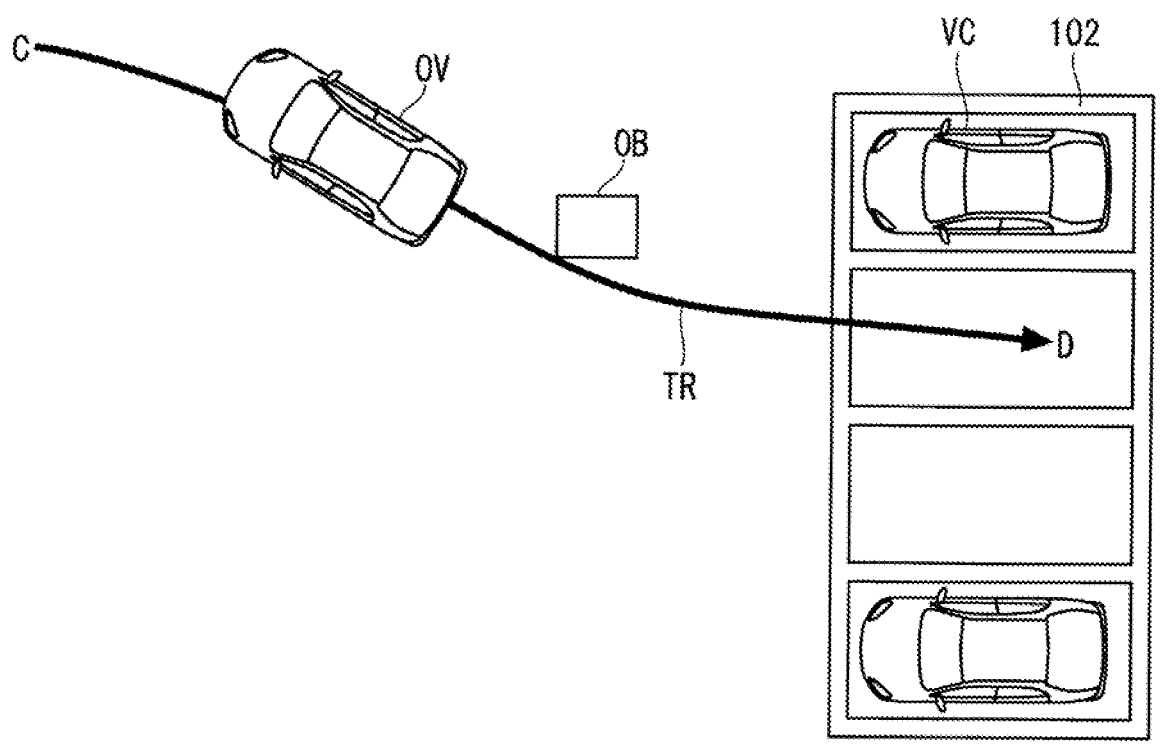
FIG. 20 is a drawing illustrating a state where an obstacle suddenly appears in back of the subject vehicle during the parking assistance.
Figure 21:
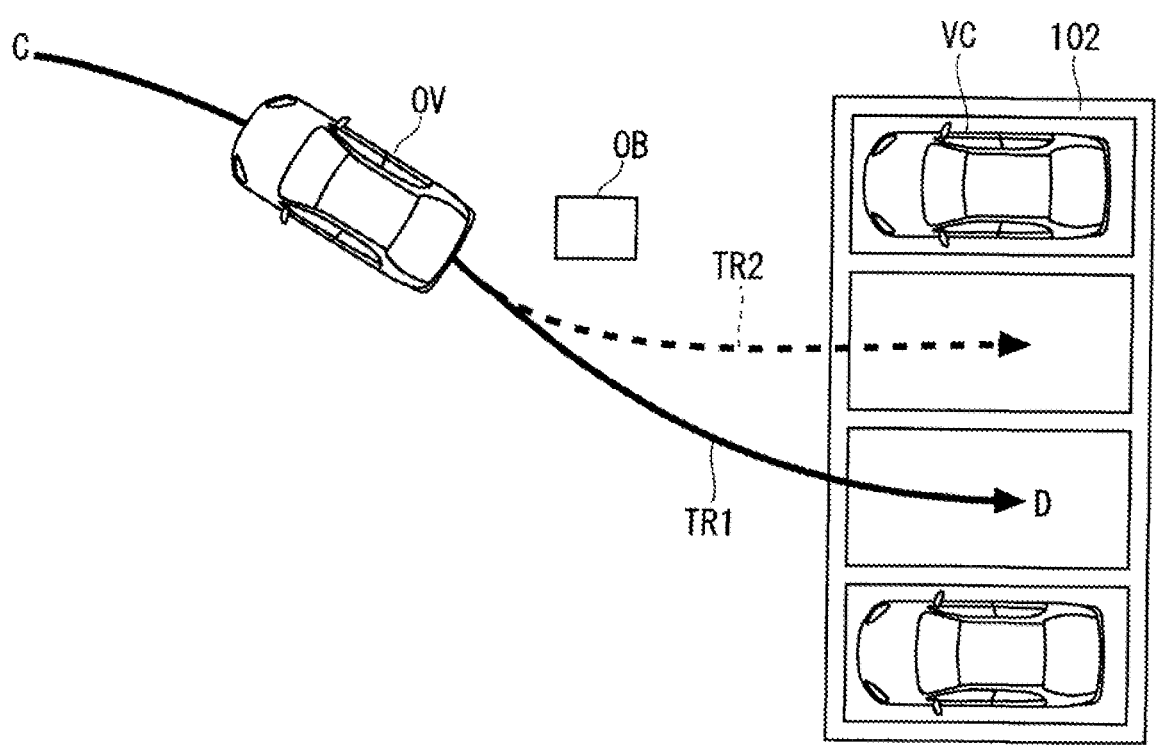
FIG. 21 is a drawing illustrating a state where the obstacle remains on the traveling route and the subject vehicle continues a stop state.

Described next using FIG. 20 and FIG. 21 is an example of an avoidance operation of avoiding the obstacle performed by the obstacle detection part 40, the parking route determination part 80, the parking route regeneration part 90, and the travel controller 30.

FIG. 20 illustrates a state where the obstacle OB suddenly appears in back of the subject vehicle OV during the parking assistance from the spot C to the spot D illustrated in FIG. 19.

As described above, the obstacle detection part 40 detects how the obstacle is located on the road surface based on the ranging value obtained by the ranging sensor, that is to say, the distance from the subject vehicle OV to the obstacle OB using the two-dimensional grid map.

When the obstacle OB suddenly appears on the traveling route TR and the object detection part 40 determines that there is the obstacle on the traveling route as illustrated in FIG. 19, the travel controller 30 stops the subject vehicle OV the predetermined distance short of the obstacle OB as illustrated in FIG. 20, thus the collision with the obstacle OB can be avoided. This predetermined distance is the margin distance optionally set from the position of the obstacle as described using FIG. 12.

FIG. 21 is a drawing illustrating a state where the obstacle OB remains on the traveling route TR and the subject vehicle OV continues a stop state. The parking route regeneration part 90 starts the processing of generating the traveling route to avoid the obstacle a predetermined period of time, for example, three seconds after the stop state of the subject vehicle, thus a time required for finishing the parking of the vehicle can be reduced.

In this case, the plurality of parking spaces are detected, thus the parking route regeneration part 90 generates the plurality of traveling routes with the small target steering angle to avoid the stationary steering for the plurality of parking spaces detected by the surrounding detection part 10. FIG. 21 illustrates the traveling route TR1 indicated by a solid line and a traveling route TR2 indicated by a broken line as an example.

The parking route determination part 80 selects the traveling route having the smallest target steering angle from the plurality of traveling routes generated by the parking route regeneration part 90 and determines the traveling route as the new traveling route, thus the traveling route TR1 in FIG. 21 becomes the new traveling route.

The travel controller 30 obtains the new traveling route from the parking route determination part 80 while the vehicle is stopped, outputs the target steering angle to the steering device so that the vehicle travels along the new traveling route, and outputs the target vehicle speed to the drive device, thereby starting the parking assistance again. Accordingly, even when there are the parking spaces in the plurality of areas or even when there is the wide parking space where the plurality of vehicles can be parked, the vehicle can be speedy parked in the parking space.

Modification Example 1

Figure 22:
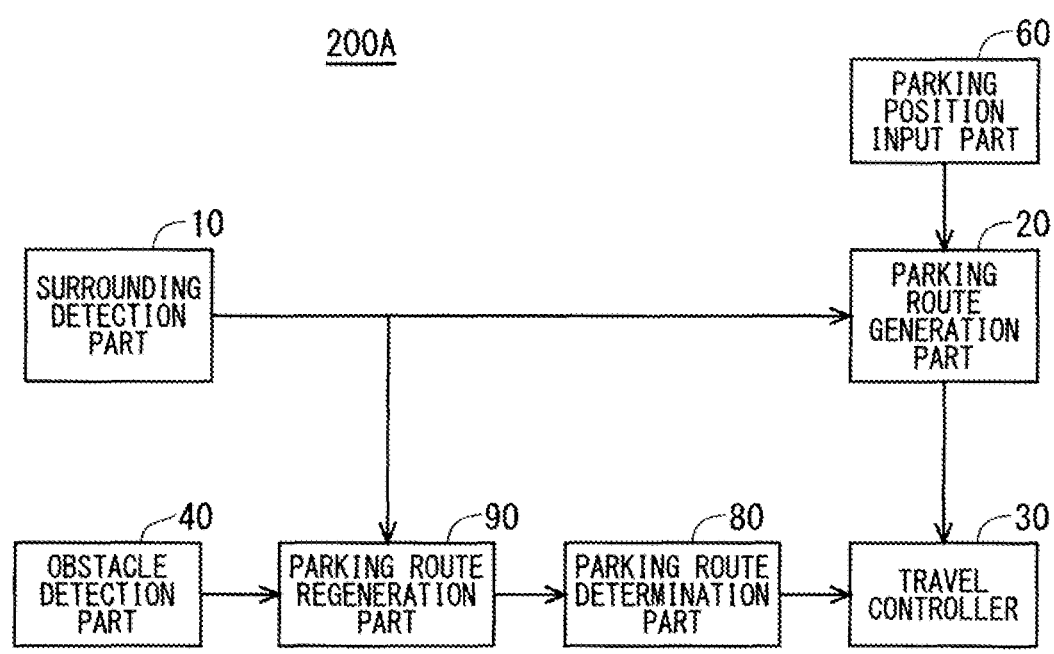
FIG. 22 is a function block diagram illustrating a configuration of a parking assistance device of a modification example 1 of the embodiment 2 according to the present invention.

FIG. 22 is a function block diagram illustrating a configuration of a parking assistance device 200A of the modification example 1 of the embodiment 2 according to the present invention. In FIG. 22, the same reference numerals are assigned to the same constituent elements as those of the parking assistance device 200 described using FIG. 17, and the repetitive description is omitted.

As illustrated in FIG. 22, the parking assistance device 200A includes a parking position input part 60 through which a user can select a parking space in addition to the configuration of the parking assistance device 200 described using FIG. 17.

A configuration and a function of the parking position input part 60 are the same as those of the parking assistance device 100A described using FIG. 15, thus the description is omitted.

The user touches a desired parking space in the video around the vehicle displayed on a display device with a touch panel function provided in the parking position input part 60, thereby being able to set the parking space of the vehicle. Thus, the user can select the parking space according to preference of the user, and convenience of the user can be achieved.

Modification Example 2

Figure 23:
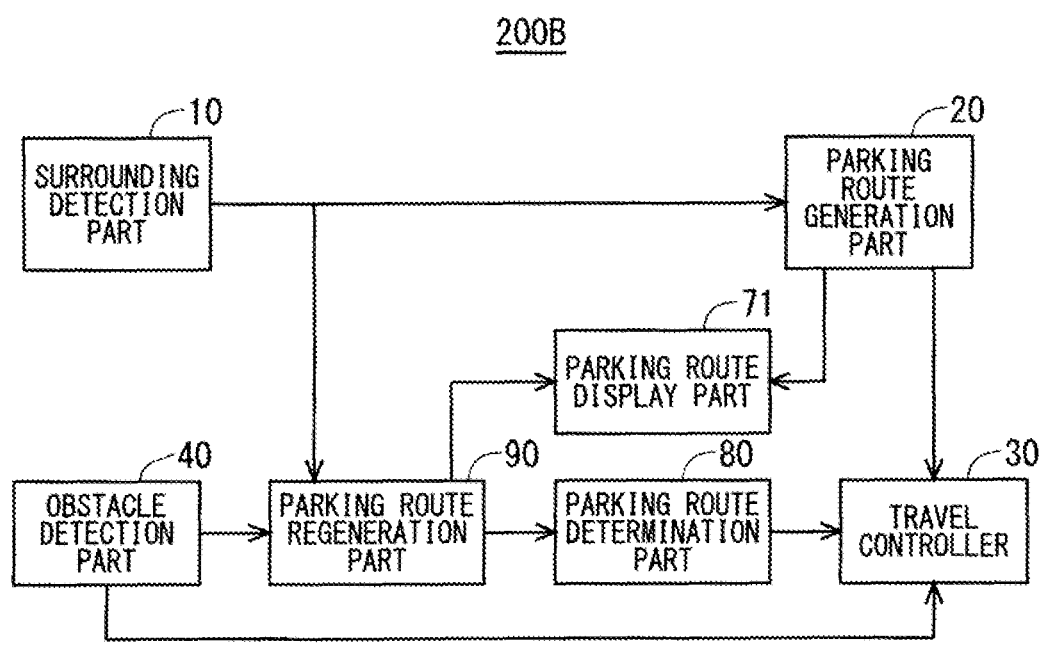
FIG. 23 is a function block diagram illustrating a configuration of a parking assistance device of a modification example 2 of the embodiment 2 according to the present invention.

FIG. 23 is a function block diagram illustrating a configuration of a parking assistance device 200B of a modification example 2 of the embodiment 2 according to the present invention. In FIG. 23, the same reference numerals are assigned to the same constituent elements as those of the parking assistance device 200 described using FIG. 17, and the repetitive description is omitted.

As illustrated in FIG. 23, the parking assistance device 200B includes a parking route display part 71 displaying a traveling route in addition to configuration of the parking assistance device 200 described using FIG. 17.

The parking route display part 71 is connected to the parking route determination part 80 and the parking route generation part 20, and a new traveling route generated by the parking route regeneration part 80 and a traveling route generated by the parking route generation part 20 are displayed on a display device with a touch panel function provided on the parking route display part 71 having a function of HMI, thus a user can be notified of the traveling route.

The user such as the driver can confirm the traveling route, and perform a selection of giving permission through the touch panel if there is no problem, thus safety can be increased.

The parking route display part 71 may double as the display device with the touch panel function of the parking position input part 60 described using FIG. 22.

Figure 24:
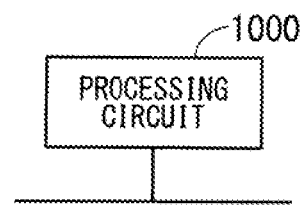
FIG. 24 is a drawing illustrating a hardware configuration achieving the parking assistance devices of the embodiments 1 and 2 according to the present invention.

The configurations of the parking assistance devices 100 and 200 described above can be made up using a computer, and each configuration thereof is executed when the computer executes a program. That is to say, the surrounding detection part 10, the parking route generation part 20, the travel controller 30, the obstacle detection part 40, and the parking route regeneration part 50 in the parking assistance device 100 illustrated in FIG. 1 and the surrounding detection part 10, the parking route generation part 20, the travel controller 30, the obstacle detection part 40, the parking route determination part 80, and the parking route regeneration part 90 in the parking assistance device 200 illustrated in FIG. 17 are achieved by a processing circuit 1000 illustrated in FIG. 24, for example. A processor such as a central processing unit (CPU) or a digital signal processor (DSP) is applied to the processing circuit 1000, and a function of each configuration described above is achieved by executing a program stored in a storage device.

Dedicated hardware may be applied to the processing circuit 100. When the processing circuit 1000 is the dedicated hardware, a single circuit, a complex circuit, a programmed processor, a parallel-programmed processor, an application specific integrated circuit (ASIC), a field-programmable gate array (FPGA), or a combination of them, for example, falls under the processing circuit 1000.

Figure 25:
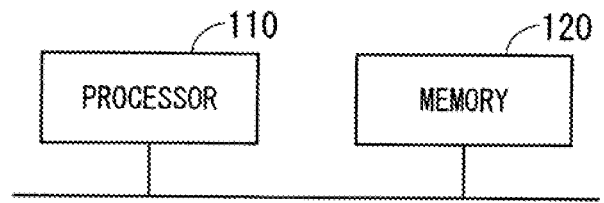
FIG. 25 is a drawing illustrating a hardware configuration achieving the parking assistance devices of the embodiments 1 and 2 according to the present invention.

FIG. 25 illustrates a hardware configuration in a case where each configuration of the parking assistance device 100 illustrated in FIG. 1 (the surrounding detection part 10, the parking route generation part 20, the travel controller 30, the obstacle detection part 40, and the parking route regeneration part 50) and each configuration of the parking assistance device 200 illustrated in FIG. 17 (the surrounding detection part 10, the parking route generation part 20, the travel controller 30, the obstacle detection part 40, the parking route determination part 80, and the parking route regeneration part 90) are made up using a processor. In this case, the function of each configuration of the parking assistance devices 100 and 200 is achieved by a combination with software etc. (software, firmware, or software and firmware). The software etc. is described as a program and is stored in a memory 120. A processor 110 functioning as the processing circuit 1000 reads out and executes a program stored in the memory 120 (storage device), thereby achieving the function of each part.

Although the present invention is described in detail, the foregoing description is in all aspects illustrative and does not restrict the invention. It is therefore understood that numerous modifications and variations can be devised without departing from the scope of the invention.

According to the present invention, each embodiment can be arbitrarily combined, or each embodiment can be appropriately varied or omitted within the scope of the invention.

The invention claimed is:

1. A parking assistance device, comprising:
    a surrounding detection circuitry detecting surrounding information of a vehicle which is to be parked to detect a parking space where the vehicle is to be parked;
    a parking route generation circuitry generating a traveling route from a current position of the vehicle to the parking space detected by the surrounding detection circuitry;
    a travel controlling circuitry making the vehicle travel to the parking space along the traveling route;
    an obstacle detection circuitry detecting an obstacle around the vehicle; and
    a parking route regeneration circuitry generating a new traveling route to avoid a collision between the vehicle and the obstacle and park the vehicle in the parking space when the obstacle detection circuitry detects the obstacle on the traveling route in a case where the travel controlling circuitry makes the vehicle travel to the parking space along the traveling route, wherein the travel controlling circuitry makes the vehicle travel along the new traveling route when the new traveling route is generated, and the parking route regeneration circuitry generates the new traveling route based on the surrounding information detected by the surrounding detection circuitry after an elapse of a predetermined period of time after the obstacle detection circuitry detects the obstacle and the vehicle stops.

2. A parking assistance device, comprising:

a surrounding detection circuitry detecting surrounding information of a vehicle which is to be parked to detect a parking space where the vehicle is to be parked;

a parking route generation circuitry generating a traveling route from a current position of the vehicle to the parking space detected by the surrounding detection circuitry;

a travel controlling circuitry making the vehicle travel to the parking space along the traveling route;

an obstacle detection circuitry detecting an obstacle around the vehicle; and a parking route regeneration circuitry generating a new traveling route to avoid a collision between the vehicle and the obstacle and park the vehicle in the parking space when the obstacle detection circuitry detects the obstacle on the traveling route in a case where the travel controlling circuitry makes the vehicle travel to the parking space along the traveling route, wherein when the surrounding detection circuitry detects a plurality of parking spaces or detects a wide parking space available for a plurality of vehicles, and when the obstacle detection circuitry detects the obstacle on the traveling route in a case where the travel controlling circuitry makes the vehicle travel to the parking space along the traveling route, the parking route regeneration circuitry generates a plurality of traveling routes to avoid a collision between the vehicle and the obstacle and park the vehicle in the plurality of parking spaces or the wide parking space, and the parking assistance device further comprises a parking route determination circuitry provided between the parking route regeneration circuitry and the travel controlling circuitry to determine the new traveling route from the plurality of traveling routes generated by the parking route regeneration circuitry.

3. The parking assistance device according to claim 2, wherein each of the plurality of traveling routes is generated as a traveling route having a small target steering angle and avoiding a stationary steering on the plurality of parking spaces or the wide parking space while avoiding a collision between the vehicle and the obstacle, and the parking route determination circuitry selects a traveling route having a smallest target steering angle from the plurality of traveling routes, thereby determining the new traveling route.

4. The parking assistance device according to claim 1, wherein the travel controlling circuitry stops the vehicle before the obstacle when the obstacle detection circuitry detects the obstacle.

5. The parking assistance device according to claim 2, wherein the parking route regeneration circuitry generates the plurality of traveling routes based on the surrounding information detected by the surrounding detection circuitry after an elapse of a predetermined period of time after the obstacle detection circuitry detects the obstacle and the vehicle stops.

6. The parking assistance device according to claim 1, further comprising a display circuitry displaying the traveling route generated by the parking route generation circuitry and the new traveling route generated by the parking route regeneration circuitry.

7. The parking assistance device according to claim 2, further comprising a display circuitry displaying the traveling route generated by the parking route generation circuitry and the new traveling route determined by the parking route determination circuitry.

8. The parking assistance device according to claim 6, wherein the display circuitry is configured to allow a user to select whether or not to adopt the traveling route which is displayed.

9. The parking assistance device according to claim 7, wherein the display circuitry is configured to allow a user to select whether or not to adopt the traveling route which is displayed.

10. The parking assistance device according to claim 1, further comprising a parking position input circuitry configured to select a parking space when the surrounding detection circuitry detects a plurality of parking spaces or detects a wide parking space available for a plurality of vehicles.

11. The parking assistance device according to claim 2, further comprising a parking position input circuitry configured to select a parking space when the surrounding detection circuitry detects a plurality of parking spaces or detects the wide parking space.

12. The parking assistance device according to claim 1, wherein the obstacle detection circuitry detects how the obstacle is located on a road surface based on a distance from the vehicle to the obstacle using a two-dimensional grid type map.

13. A parking assistance method, comprising:

a process (a) of detecting surrounding information of a vehicle to detect a parking space where the vehicle is to be parked;

a process (b) of generating a traveling route from a current position of the vehicle to the parking space detected in the process (a);

a process (c) of making the vehicle travel to the parking space along the traveling route;

a process (d) of confirming whether or not an obstacle is detected on the traveling route when the vehicle travels to the parking space along the traveling route;

a process (e) of generating a new traveling route to avoid a collision between the vehicle and the obstacle and park the vehicle in the parking space when the obstacle is detected on the traveling route in the process (d); and a process (f) of making the vehicle travel along the new traveling route when the new traveling route is generated, wherein the process (e) includes a process of generating the new traveling route based on the surrounding information after an elapse of a predetermined period of time after the obstacle is detected and the vehicle stops.

14. A parking assistance method, comprising:
a process (a) of detecting surrounding information of a vehicle to detect a parking space where the vehicle is to be parked;
a process (b) of generating a traveling route from a current position of the vehicle to the parking space detected in the process (a);
a process (c) of making the vehicle travel to the parking space along the traveling route;
a process (d) of confirming whether or not an obstacle is detected on the traveling route when the vehicle travels to the parking space along the traveling route;
a process (e) of generating a new traveling route to avoid a collision between the vehicle and the obstacle and park the vehicle in the parking space when the obstacle is detected on the traveling route in the process (d); and
a process (f) of making the vehicle travel along the new traveling route when the new traveling route is generated, wherein
when a plurality of parking spaces or a wide parking space available for a plurality of vehicles is detected in the process (a), and
when the obstacle is detected on the traveling route in the process (d),
the process (e) includes a process (e-1) of generating a plurality of traveling routes to avoid a collision between the vehicle and the obstacle and park the vehicle in the plurality of parking spaces or the wide parking space, and the parking assistance method further comprises
a process (g) of determining the new traveling route from the plurality of traveling routes after the process (e) and before the process (f).

15. The parking assistance method according to claim 14, wherein
the process (e-1) includes a process of generating each of the plurality of traveling routes as a traveling route having a small target steering angle and avoiding a stationary steering on the plurality of parking spaces or the wide parking space while avoiding a collision between the vehicle and the obstacle, and
the process (g) includes a process of selecting a traveling route having a smallest target steering angle from the plurality of traveling routes, thereby determining the new traveling route.

\* \* \* \* \*